2 Sheets—Sheet 1.

J. HEIMLICH & L. O DEHNEL.
Oscillating Water-Meter.

No. 203,039. Patented April 30, 1878.

Witnesses.
O W Gillett
N. W. Cutter

Inventors.
J Heimlich
L O Dehnel
Per Burridge & Co
Attys

2 Sheets—Sheet 2.

J. HEIMLICH & L. O. DEHNEL.
Oscillating Water-Meter.

No. 203,039. Patented April 30, 1878.

Witnesses.
OW Gillett
N. W. Cutter

Inventors.
J Heimlich
L O Dehnel
Per Burridge & Co
Attys

UNITED STATES PATENT OFFICE.

JOHN HEIMLICH AND LOUIS O. DEHNEL, OF SANDUSKY, OHIO.

IMPROVEMENT IN OSCILLATING WATER-METERS.

Specification forming part of Letters Patent No. 203,039, dated April 30, 1878; application filed March 5, 1878.

*To all whom it may concern:*

Be it known that we, JOHN HEIMLICH and LOUIS O. DEHNEL, of Sandusky, in the county of Erie and State of Ohio, have invented a certain new and Improved Water-Meter; and we do hereby declare that the following is a full, clear, and complete description thereof, reference being had to the accompanying drawings, making a part of the same, in which drawings—

Figure 1:
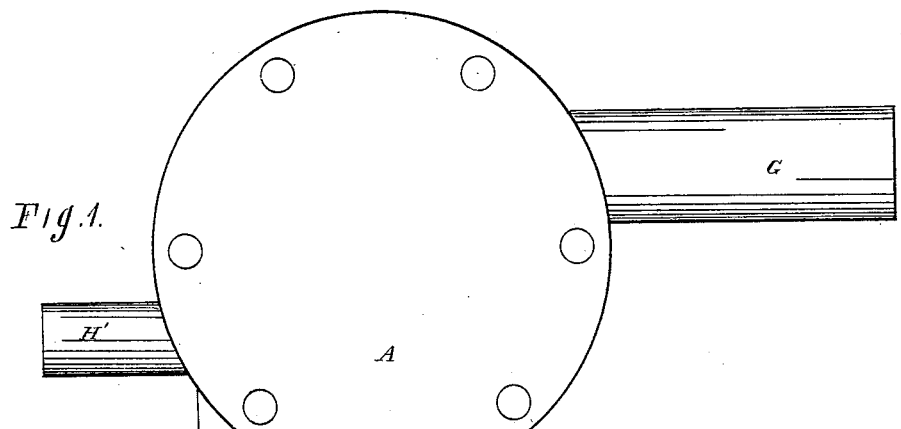
Figure 2:
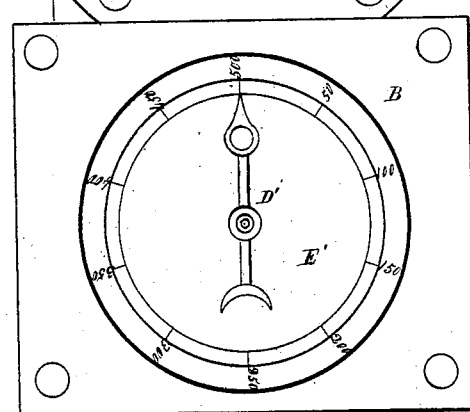
Figure 3:
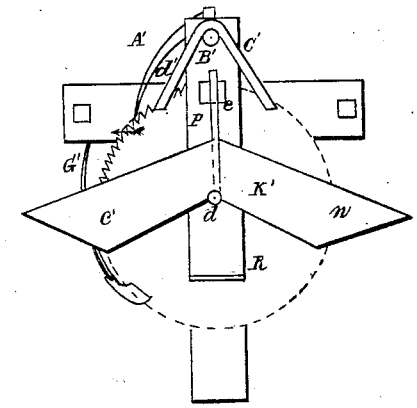
Figure 4:
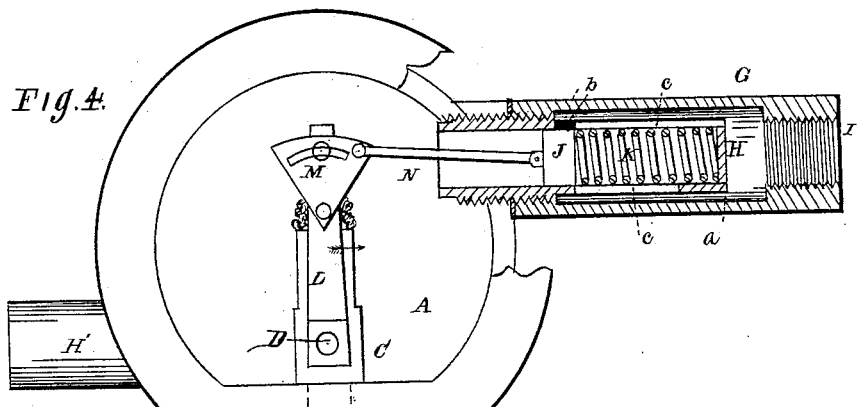
Figure 5:
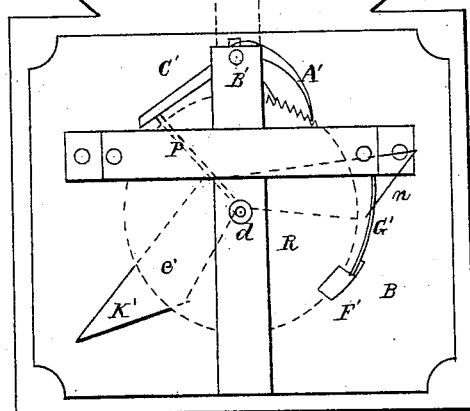
Figure 6:
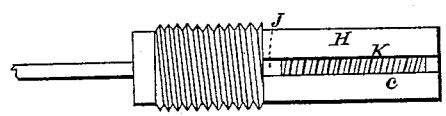

Figure 1 is a front view of the water-meter. Fig. 3 is a side view of the inside, partially in section. Fig. 4 is a front view of the inside, partially in section. Figs. 2, 5, and 6 are detached sections.

Like letters of reference refer to like parts in the several views.

This invention has for its object the measuring of water, so that the amount drawn from a hydrant to which the meter is attached may be accurately known. Said meter consists of an upper and lower chamber, communicating with each other by a pipe in which is a stop-cock, the key of which is attached to and operated by a piston moving in the eduction-pipe of the meter. The piston is moved forward by the pressure of the hydrant, and moved back, when the pressure is removed, by a spring. This movement of the piston opens the stop-cock, to allow water to pass into the lower chamber for tallying the amount that may be drawn from the upper one.

A further and more full description is as follows: The water-meter, as hereinbefore said, consists of two compartments or chambers, A and B, Figs. 1 and 4, both of which are to be water-tight and have communication with each other by a pipe, C. In that part of the pipe in the chamber A is fitted a plug or key, D, which, together with the pipe, forms a stop-cock, as shown in Figs. 3 and 4. A detached view thereof, partially in section, is shown in Fig. 5. Said key is retained, close fitting in its seat, by a spring, E, and nut on the outer end thereof, as shown in the drawings.

The section F of the pipe above the stop-cock is filled with sponge, or with other suitable material for filtering the water that may pass therein to the lower chamber.

G, Fig. 1, is the draft or eduction pipe of the meter, and which consists of two sections—viz., an inner pipe, H, Fig. 4, screwed into the side of the chamber A, and inclosed by an outer pipe or shell, I, screwed on over it, as shown in Fig. 4. The inside of the shell, immediately around the inclosed pipe, is recessed or chambered, thereby forming an annular space, $a$, around the pipe. In said pipe is fitted, so as to move freely therein, a piston, J, Fig. 4, between which and the end of the pipe is a spring, K, the resiliency of which forces the piston back to the position shown in the drawings. Said piston operates the stop-cock alluded to, and is attached to the same as follows: To the arm L of the stop-cock is secured an adjusting-plate, M, to which the piston is attached by a connecting-rod, N, substantially as shown in Fig. 4. In the sides of the eduction-pipe are slots $c$, (outlets of the pipe,) the end of the pipe being closed. In the upper slot of the pipe projects a lug, $b$, on the side of the piston, to prevent the piston from turning in the pipe, thereby avoiding a twisting or cramping of the connections of the piston with the stop-cock, so that it may work freely and easily for actuating the said cock.

In the lower compartment or chamber B is arranged the tallying device of the meter, and which consists of a vibrating bucket, K', Figs. 3 and 2, hung on a shaft, $d$, having its bearings in a bracket, O. Said bucket is divided into two equal compartments, $n$ and $c'$, by a partition-plate, P, Figs. 2 and 3. On the shaft Q, Fig. 3, is secured a ratchet-wheel, R, of which A' is the pawl, pivoted in an arm projecting from the shaft B'. On said shaft B' is also secured a pair of arms, C', between which the partition P, alluded to, of the bucket projects, thereby placing an arm on either side of the partition, as shown in Fig. 2, the purpose of which will presently be shown.

On the shaft carrying the ratchet-wheel referred to is a pointer or index, D', made to revolve around on the face of the dial E' by the pawl-and-ratchet wheel above described, for a purpose presently shown. F', Fig. 4, is a brake, embracing the edge of the ratchet-wheel, and which is kept in contact therewith by a spring, G', to which it is attached and suspended from the frame.

Having described the construction and arrangement of the machine, the operation thereof is as follows: The meter is attached to the water-pipe by the induction-pipe H', and by which it is filled with water from the hydrant. When water is needed it is drawn therefrom, through the eduction-pipe G, by opening a stop-cock that may be attached to said pipe G. The water thus being drawn from the chamber A, relieves the pressure from the outer side of the piston J more or less, as the quantity of water drawn off. This reduction of the pressure causes the pressure of the water from the hydrant to force forward the piston along in the pipe proportionately as the decrease of pressure may be on the opposite side of the piston. This forward movement of the piston partially uncovers the slots in the sides of the pipe, so that water flows through them from the chamber into the annular space $a$, thence to the outside through the pipe G, to which the draft-cock alluded to is attached.

It will be observed that the water follows the piston, and the amount that flows from the chamber will be more or less, as the distance the piston may be moved along in the pipe H— that is to say, the farther the piston is pushed forward along in the pipe the more of the slots therein will be open for the outflow of water from the chamber, as no water can pass out from the chamber only through the slots behind the piston. The pressure on the piston continues so long as water is being drawn; but on ceasing to draw the equilibrium of pressure on the piston is restored. The piston is then forced back to the position shown in the drawings by the spring K, thereby shutting off the slots that were open behind the piston, so that no water can pass out from the chamber from behind the piston, nor around it, as it is fitted closely in the pipe. As the piston is forced forward by the normal pressure of the hydrant, the arm L is carried in direction of the arrow, Fig. 4. This movement of the arm turns the key of the stop-cock more or less, as the distance of the movement may be, thereby opening a communication between the chambers A and B. It will be observed that said open relation of the two chambers will be in proportion to the distance that the piston is moved along in the eduction-pipe H. The farther the piston is pushed forward the greater distance will the arm L be carried, and consequently more will the stop-cock be opened; hence the water passing from the upper to the lower chamber through the cock will have a proportionate relation of quantity to that passing out of the chamber through the eduction-pipe, which, as compared therewith, is very little, the differential relation of the one to the other being of a certain quantity.

The small amount of water that flows through the stop-cock falls directly into one of the compartments of the bucket that may be upward and under the end of the pipe C, one or the other of which will be upward at all times, by virtue of the weight $e$, Figs. 2 and 3, attached to the upper end of the partition-plate P, which, when it is directly over the axial line of vibration, as seen in Fig. 2, the buckets balance each other; but when the weight has passed either way from such position, the weight will carry down the bucket by virtue of the greater weight on one side of the axis of vibration than on the other. Said weight is equal to a certain measure of water that may fall into the upper bucket, and which may be, more or less, according to the size of the weight that may be used. When so much water has fallen into the upper bucket $n$ as to counterbalance the down one $c'$ and the weight, the bucket will descend, and the empty one, $c'$, ascend to the position occupied by $n$, under the end of the pipe C. At the same time the now down bucket $n$ has discharged its contents into the chamber B, which will again ascend when the upper bucket becomes full enough to counterbalance the lower one. This alternating action of the buckets actuates the ratchet-wheel R by the pawl A'. Said pawl is operated by the arms C' $d'$, which, as the partition-plate P vibrates, it alternately impinges, respectively, upon the arms. When moving in direction of the arrow, Fig. 2, the arm $d'$ causes the pawl to rotate the ratchet-wheel one notch, thereby moving the pointer D' one degree on the dial. Said degree may indicate any number of gallons, showing that so many gallons of water have been drawn from the hydrant—that is to say, the quantity of water falling into one bucket, and sufficient to vibrate it, is a measure of the amount drawn off during such filling and vibration of the bucket, and which amount is accordingly indicated by the dial of the meter, and which may be five hundred or five thousand gallons, more or less, for each and every vibration of the bucket, as the scale on the dial may have been graduated.

The amount of water in each bucket necessary to vibrate it is regulated by adding to or taking from the weight $e$. By this means a few drops of water may be made sufficient to vibrate it, and which few drops may be taken as the measure of the quantity drawn from the hydrant during the time of vibration, and which will be duly indicated by the dial, as aforesaid. The water in the lower chamber is allowed to escape through an outlet in the bottom.

The movement of the key D of the stop-cock is not to the extent as to bring the hole $i'$ in open relation to the bore of the pipe, as it would allow too much water to pass through. To avoid this slight grooves $i$ are cut from the hole back, so that on a slight turn of the key the grooves will come to the bore of the pipe, and through which water will pass in consequence of the normal pressure of the hydrant.

What we claim as our invention, and desire to secure by Letters Patent, is—

1. In combination with the chamber A, the slotted eduction-pipe H, piston J, spring K, and sleeve or shell I, substantially as herein described, and for the purpose set forth.

2. The measuring stop-cock, consisting of the pipe C, key D, perforation $i$, provided with grooves or channels $i'$, arranged in relation to and in combination with the piston J and eduction-pipe, substantially as described, and for the purpose set forth.

JOHN HEIMLICH.
LOUIS O. DEHNEL.

Witnesses:
LOUIS TRAUB,
CAROLINE TRAUB.